April 3, 1934. F. W. LEE Re. 19,129

ELECTRICAL TRANSLATING APPARATUS

Original Filed Oct. 30, 1926 2 Sheets-Sheet 1

INVENTOR
Frederick W. Lee
BY
HIS ATTORNEY

April 3, 1934. F. W. LEE Re. 19,129

ELECTRICAL TRANSLATING APPARATUS

Original Filed Oct. 30, 1926 2 Sheets-Sheet 2

INVENTOR
Frederick W. Lee
BY A R Vincell
HIS ATTORNEY

Reissued Apr. 3, 1934

Re. 19,129

UNITED STATES PATENT OFFICE 19,129

ELECTRICAL TRANSLATING APPARATUS

Frederick W. Lee, Baltimore, Md., assignor to The Union Switch & Signal Company, Swissvale, Pa., a corporation of Pennsylvania Original application October 30, 1926, Serial No. 145,265. Divided and application February 5, 1930, Patent No. 1,855,639, dated April 26, 1932. Application for reissue April 29, 1933, Serial No. 668,649

30 Claims. (Cl. 246—34)

My invention relates to electrical translating apparatus, and particularly to apparatus of the type comprising an input circuit which is at times supplied with current, and an output circuit in which the flow of current is controlled in accordance with the current supplied to the input circuit.

My original application, Serial No. 426,033, filed Feb. 5, 1930, which matured into my original Patent No. 1,855,639, dated April 26, 1932, (of which the present case is an application for re-issue), was a division of my application Serial No. 145,265, filed Oct. 30, 1926, which latter application has matured into Patent No. 1,797,268, dated March 24, 1931.

I will describe several forms of translating apparatus embodying my invention, and will then point out the novel features thereof in claims.

Figure 1:
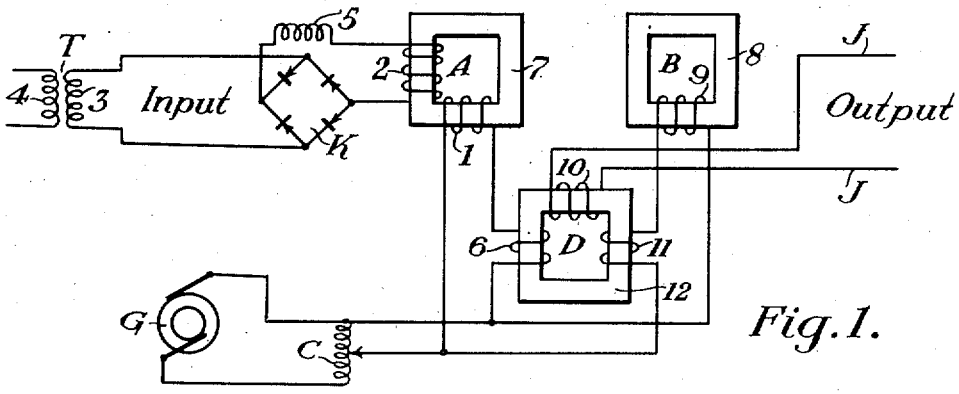
Figure 2:
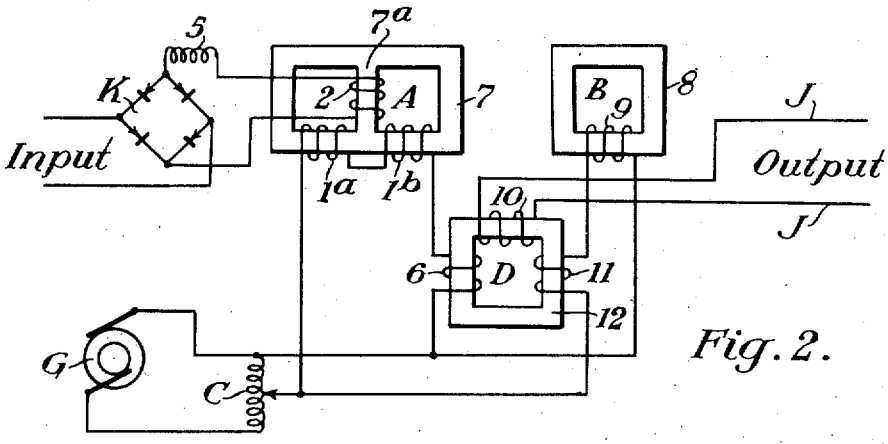
Figure 4:
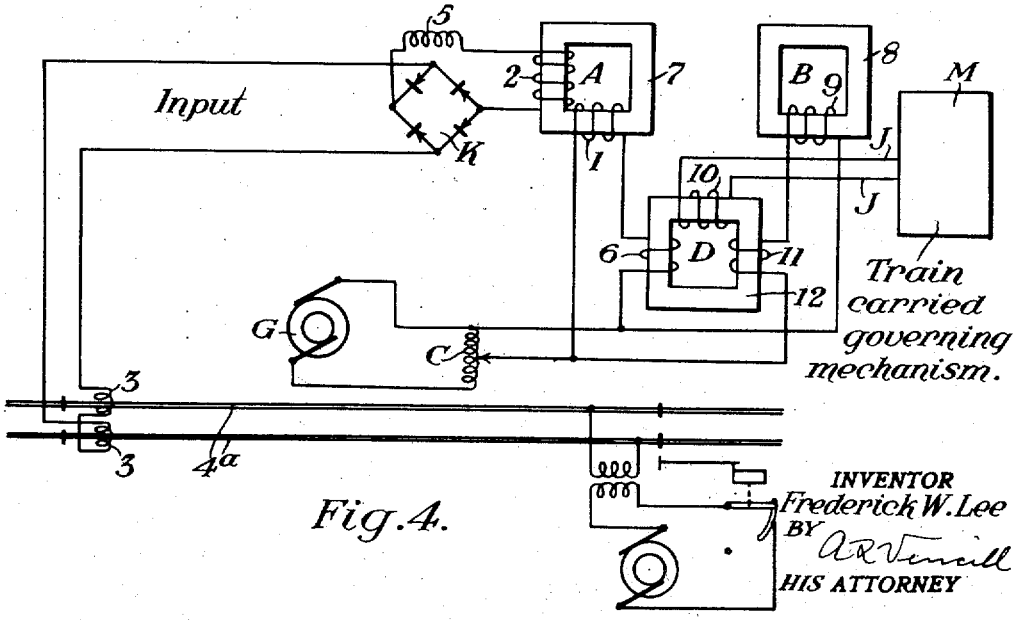
Figure 3:
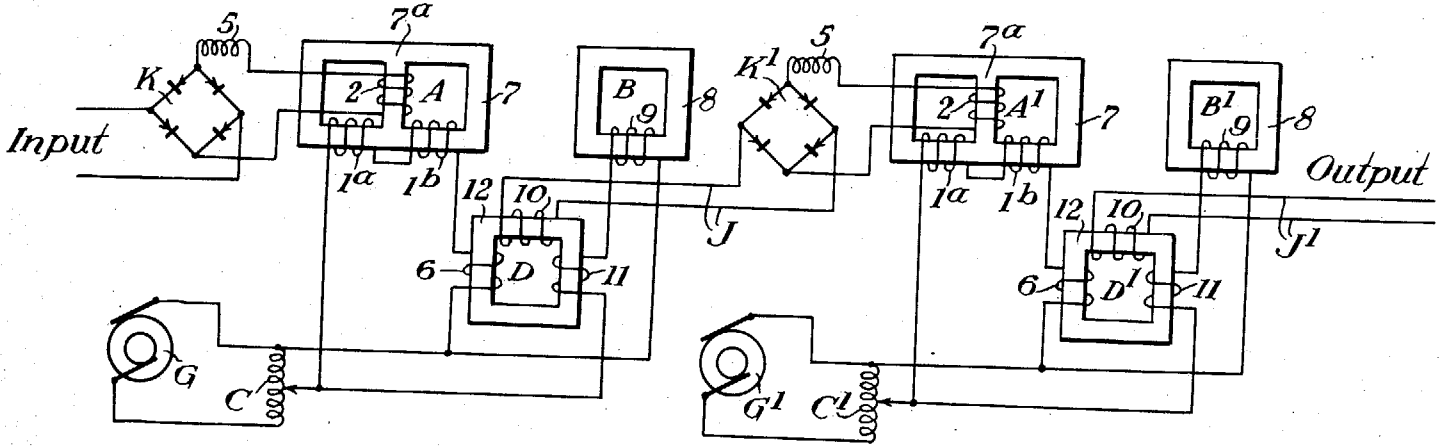

In the accompanying drawings, Fig. 1 is a diagrammatic view illustrating one form of translating apparatus embodying my invention. Fig. 2 is a view similar to Fig. 1 showing a modified form of the reactor A. Fig. 3 is a view showing two sets of translating apparatus connected in cascade. Fig. 4 is a diagrammatic view showing one form of railway traffic controlling apparatus embodying my invention.

Similar reference characters refer to similar parts in each of the views.

Referring first to Fig. 1, the reference character A designates a reactor having a magnetizable core 7 provided with two windings 1 and 2. Winding 2 is at times supplied with current from the input circuit which may in turn be supplied with energy in any suitable manner. In the form here shown alternating current is supplied to the input circuit from a secondary 3 of a transformer T, the primary 4 of which is supplied with alternating current from a suitable source not shown in the drawing. A rectifier K of any suitable type is interposed between the input circuit and the winding 2 so that unidirectional current is supplied to the winding. An impedance 5 is interposed between the rectifier K and the winding 2 to limit the alternating component of the current supplied to the winding from the rectifier.

Alternating current is supplied to winding 1 of the reactor A in series with the primary 6 of a transformer D from a source which is here shown as an auto transformer C having its primary terminals connected with an alternator G. The core 12 of transformer D also carries a secondary winding 10 which is connected with the conductors J of an output circuit. The output circuit may supply current to an electro-responsive device of any suitable type or may feed into the input circuit of a second stage of translating apparatus similar to that here shown.

Current supplied to the input circuit causes a unidirectional current to flow in winding 2 and thereby creates in core 7 of reactor A a unidirectional flux. The intensity of this flux is a function of the strength of the current supplied to winding 2 and is therefore a function of the magnitude of the input energy. The effective impedance of winding 1 is dependent upon the reluctance of the core 7 and since the reluctance of this core varies with the degree of saturation of the core, it follows that variations in the input energy cause corresponding variations in the effective impedance of winding 1. But the winding 1 is supplied with alternating current in series with primary 6 of transformer D. It follows therefore that variations in the effective impedance of winding 1 cause corresponding variations current flowing through the primary 6. These variations cause corresponding changes in the voltage induced in secondary 10 of transformer D and therefore serve to control the current supplied to the output conductors J in accordance with the input energy.

Under all conditions a small magnetizing current will flow in winding 1 and this current will also flow in primary 6 of transformer D. In the absence of any preventative means this small current would induce a voltage in winding 10 which might be undesirable. In order to eliminate the effect of this magnetizing current I provide a second reactor B similar to reactor A and comprising a core 8 carrying a winding 9. Core 12 of transformer D is also provided with a second primary 11 similar to primary 6 and connected in series with winding 9 of reactor B to the transformer C. The reactors A and B preferably have similar electrical constants and the windings 6 and 11 are so proportioned and connected that under normal conditions the flux created in core 12 by the magnetizing current for winding 1 flowing through primary 6 is equal and opposite to the flux created in core 12 by the magnetizing current for winding 9 which flows through primary 11. It follows therefore that the effect of the magnetizing current for each of the reactors A and B annuls the effect of the magnetizing current for the other reactor in so far as the transformer D is concerned. When energy is supplied to the input circuit, however, the unidirectional flux then created in core 7 of reactor A, causes a change in the current through primary 6 which in turn varies the voltage induced in secondary 10 of transformer D.

It is obvious that the magnitude of the output energy may be many times larger than the magnitude of the input energy, because by suitable adjustment of the voltage of transformer C, any desired amount of power may be supplied to the output circuit, and that changes in the input energy will cause corresponding changes in the output energy.

In the apparatus illustrated in Fig. 1, the output current may be considerably distorted due to distortion in the current which flows through winding 1 of the reactor A as a result of the unidirectional flux created in the coil of this reactor. This distortion may be undesirable, and with the apparatus shown in Fig. 2 the reactor A is designed to eliminate distortion of the wave form. Referring to the latter figure, the core 7 of the reactor is provided with a bridging member $7^a$ which carries winding 2 and which forms a common member to two parallel magnetic paths through the core. Two coils $1^a$ and $1^b$ are located upon the core 7, one of these coils being linked by each of the magnetic paths. The two coils $1^a$ and $1^b$ are connected in series and since the flux from winding 2 threads these coils in opposite direction, it follows that the distortions produced in these coils are superposed and as a result the wave form of the current which flows through primary 6 of transformer D is symmetrical.

Apparatus embodying my invention is particularly suitable for use in automatic train control systems of the inductive type, such for example as the system disclosed in Letters Patent of the United States No. 1,505,069, granted to L. V. Lewis on August 12, 1924, for Railway traffic controlling apparatus. A system of this character is shown in Fig. 4, wherein the secondary 3 of the transformer T which supplies the input circuit is carried on the locomotive, and the rails $4^a$ of a section of railway track constitute the primary of this transformer. The output circuit J controls train-carried governing mechanism M of any suitable type.

Electrical translating apparatus embodying my invention may be used as a single stage amplifier, or several stages of apparatus may be connected as suggested hereinbefore with the output circuit of one stage feeding the input circuit of a succeeding stage to form a multi-stage cascade connected amplifier. For example, I have illustrated, in Fig. 3, a two stage cascade connected amplifier connected as described above. In this modification, the parts K, A, B, D, G and C together with their associated circuits comprise a first stage identical with the apparatus shown in Fig. 2. The second stage, comprising parts $K^1$, $A^1$, $B^1$, $D^1$, $G^1$ and $C^1$, is an exact duplicate of the first stage, and the output conductors J of the first stage are connected directly with the input terminals of the rectifier $K^1$ feeding winding 2 on reactor $A^1$ of the second stage. The output conductors $J^1$ may feed into a succeeding amplifier stage similar to those here illustrated, or may supply energy to any other suitable load.

Translating apparatus embodying my invention may also be used to operate as an electrical relay in which case a device connected with the output circuit of the translating apparatus would be controlled in accordance with the current supplied to the input circuit of the apparatus.

Attention should also be drawn to the fact that although I have shown the input circuit supplying the windings 1 of the translating apparatus through a rectifier K this rectifier is not essential.

Although I have herein shown and described only a few forms of electrical translating apparatus embodying my invention, it is understood that various changes and modifications may be made therein within the scope of the appended claims without departing from the spirit and scope of my invention.

Having thus described my invention, what I claim is:

1. In combiantion, a transformer having a primary and a secondary, an iron core reactor, a circuit for the reactor including said primary and a source of alternating current, means for at times varying the effective impedance of the reactor, and means for annulling the flux created in the transformer by the reactor magnetizing current in said circuit.

2. In combination, a transformer having a secondary and two primaries, two reactors one connected in series with each primary and a source of alternating current, and means for at times varying the effective impedance of one of said reactors but not the other.

3. In combination, a transformer having a secondary and two primaries, two reactors one connected in series with each primary and a source of alternating current, the two primaries being arranged in such manner that the fluxes normally created thereby in the transformer core are in opposition, and means for at times varying the effective impedance of one of said reactors.

4. In combination, a transformer having a secondary and two primaries, two reactors one connected in series with each primary and a source of alternating current, and means for at times supplying a unidirectional magnetic flux to the core of one said reactor but not the other.

5. In combination, a transformer having a primary and a secondary, an iron core reactor comprising two magnetic circuits having a common member, two windings one on each said circuit and connected in series with said primary and a source of alternating current, a third winding on said member and means including a rectifier for at time supplying unidirectional current to such third winding.

6. In combination, a transformer having a primary and a secondary, an iron core reactor comprising two magnetic circuits having a common member, two windings one on each said circuit, a source of alternating current for supplying energy to said two windings and said primary in series, the two magnetic fluxes created by said windings in the common member being in opposition, a third winding on the common member, and means for supplying unidirectional current to said third winding to vary the electromotive force induced in the secondary.

7. In combination, a transformer having a secondary and two primaries, two reactors one connected in series with each primary and a source of alternating current, a winding on the core of one reactor, a second source of alternating current, and means including a rectifier for at times supplying direct current from said second source to said winding to vary the degree of saturation of such one reactor.

8. Electrical translating apparatus comprising a transformer having a secondary and two primaries, a core provided with a winding, a source of alternating current connected with said winding and one said primary in series, an input circuit arranged when supplied with current to vary the impedance of said one winding, and means for supplying alternating current to the remaining said primary to oppose the flux created in said transformer by alternating current in said one primary.

9. In combination, two magnetizable cores, a first winding on one said core, a second winding on the other core, means for supplying alternating current to said first and second windings in series, means for varying the reactance of said one core, a third winding on said other core, means for supplying alternating current to said third winding to oppose the flux created in said other core by current in said second winding, and a secondary winding on said other core.

10. In combination, an iron core reactor comprising two magnetic paths having a common member, two windings one located on each said path, a transformer having two primaries and a secondary, means for supplying alternating current to said two windings and one of said primaries in series, an input winding on said common member for varying the impedance of said two windings in accordance with the current supplied to said input winding, and means for supplying the remaining primary with alternating current to oppose the flux created by current in said one primary.

11. In combination, an iron core reactor comprising two magnetic paths having a common member, a first and a second winding in inductive relation with said two paths respectively, a magnetizable core carrying a third winding; a first circuit including a source of alternating current and said first, second and third windings in series, means for at times varying the permeability of said two paths, a fourth winding on said core supplied with alternating current and so disposed that the fluxes created in said core by current in said third and fourth windings are in opposition, a fifth winding on said core, and an output circuit receiving energy from said fifth winding.

12. A control system comprising a plurality of iron core reactors having alternating current windings and direct current windings, means for controlling the energization of the direct current winding of one of said reactors, and means connected to the alternating current winding of said reactor for energizing the direct-current winding of another of said reactors, and a load device connected to the alternating current winding of said last mentioned reactor.

13. An electrical system of control comprising a plurality of iron core reactors having alternating current and direct current windings, means for energizing the direct current winding of one of said reactors, a rectifier connected to the alternating current winding of said reactor for energizing the direct current winding of another of said reactors, and a load device connected to the alternating current winding of said last mentioned reactor.

14. A power amplifying system comprising a plurality of iron core reactors having direct current and alternating current windings, the direct current winding of one of said reactors being connected to an input circuit, the alternating current winding of another of said reactors being connected to an output circuit, and means for energizing the direct current winding of the last mentioned reactor in accordance with the voltage induced in the alternating current winding of said first mentioned reactor, whereby the variations in the power supplied to said input circuit are amplified in said output circuit.

15. In combination, two magnetic amplifiers each having an input circuit and an output circuit, means for controlling the energization of the input circuit of one amplifier, a rectifier, means including said rectifier for supplying energy from the output circuit of said one amplifier to the input circuit of the other said amplifier, and an electro-responsive device receiving energy from the output circuit of said other amplifier.

16. In combination, two magnetic amplifiers each having an input circuit and an output circuit, means for controlling the energization of the input circuit of one amplifier, a rectifier, means including said rectifier for supplying the input circuit of the other said amplifier with current in accordance with the current in the output circuit of said one amplifier, and an electro-responsive device receiving energy from the output circuit of said other amplifier.

17. In combination, two magnetic amplifiers each having an input circuit and an output circuit, means for controlling the energization of the input circuit of one amplifier, a rectifier, means including said rectifier for connecting the output circuit of said one amplifier with the input circuit of said other amplifier, and an electro-responsive device receiving energy from the output circuit of said other amplifier.

18. In combination, two reactors each having a first winding supplied with alternating current and a second winding, means for controlling the energization of the second winding of one reactor to vary the impedance of the associated first winding, means including a rectifier for energizing the second winding of the other reactor in accordance with the impedance of the first winding of said one reactor, and an electro-responsive device receiving energy in accordance with the current flowing through the first winding of said other reactor.

19. In combination, a plurality of iron core reactors each having an alternating current winding constantly supplied with energy and an input winding, means for controlling the input winding of one said reactor, a transformer, means for supplying current to the primary of said transformer in accordance with the current through the alternating current winding of said one reactor, means for supplying current to the input winding of another of said reactors from the secondary of said transformer, and an electro-responsive device receiving energy in accordance with the current flowing in the alternating current winding of said other reactor.

20. In combination, a plurality of iron core reactors each having an alternating current winding constantly supplied with energy and an input winding, means for controlling the input winding of one said reactor, a transformer, means for supplying current to the primary of said transformer in accordance with the current through the alternating current winding of said one reactor, means including a rectifier for supplying current to the input winding of another of said reactors from the secondary of said transformer, and an electro-responsive device receiving energy in accordance with the current flowing in the alternating current winding of said other reactor.

21. In combination, a plurality of iron core reactors each having an alternating current winding constantly supplied with energy and an input winding, means for controlling the input winding of one said reactor, a transformer, means for supplying current to the primary of said transformer in accordance with the current through the alternating current winding of said one reactor, means for supplying current to the input winding of another of said reactors from the secondary of said transformer, an output circuit, and means including a second transformer for supplying energy to said output circuit in accordance with the current flowing in the alternating current winding of said other reactor.

22. In combination, a plurality of iron core reactors each having an alternating current winding constantly supplied with energy and an input winding, means for controlling the input winding of one said reactor, a transformer, means for supplying current to the primary of said transformer in accordance with the current through the alternating current winding of said one reactor, means for supplying current to the input winding of another of said reactors from the secondary of said transformer, an output circuit, means including a second transformer for supplying energy to said output circuit in accordance with the current flowing in the alternating current winding of said other reactor, and means for annulling the flux created in each said transformer by the magnetizing current of the associated reactor.

23. In combination, a section of railway track, means for supplying current to the rails of said section, a device having a magnetizable core provided with a winding controlled by current received from the rails of said section and in turn acting to vary the permeability of at least a portion of said core, a circuit including a source of alternating current the voltage of which is independent of the current in the track rails said circuit also including a winding of said device for varying the amount of current flowing in said circuit in accordance with variations of the permeability of said core caused by said control winding, and a signal controlled in accordance with the amount of current flowing in said circuit.

24. In combination, a section of railway track, means for supplying current to the rails of said section, a device having a magnetizable core provided with a winding controlled by current received from the rails of said section and in turn acting to vary the permeability of at least a portion of said core, a signal, and a control circuit including a source of alternating current and having its impedance varied in response to variations of the permeability of said core for controlling the signal in response to variations of the impedance of said circuit.

25. In combination, a section of railway track, means for supplying current to the rails of said section, a device having a magnetizable core provided with a winding controlled by current received from the rails of said section and in turn acting to vary the permeability of at least a portion of said core, a signal, and a control circuit including a source of alternating current and a winding of said device the impedance of which is varied in response to variations of the permeability of said core for controlling the signal in response to variations in the impedance of such winding.

26. The combination, in a railway signal system, of a reactor having a direct current winding and an alternating current winding, said windings being arranged on a core of magnetic material, means responsive to the conditions of a section of the track of said system for controlling the direct current energization of said direct current winding to vary the impedance of said alternating current winding, a source of alternating current connected in circuit with said alternating current winding and a signal device responsive to variations in the impedance of said alternating current winding.

27. The combination, in a railway signal system, of a saturable reactor, a signal, a circuit including a source of energy and a winding of said reactor for controlling said signal in accordance with the impedance of said winding, and means to control the degree of saturation of said reactor in response to the condition of a section of the track of said system.

28. In combination with a section of railway track supplied with alternating current, a train carried device having a magnetizable core provided with a winding controlled by current received from the rails of said section and in turn acting to vary the permeability of at least a portion of said core, a circuit including a source of alternating current the voltage of which is independent of the current in the track rails said circuit also including a winding on said device for varying the amount of current flowing in said circuit in accordance with variations of the permeability of said core caused by said control winding, and train carried governing mechanism controlled in accordance with the amount of current flowing in said circuit.

29. In combination with a section of railway track supplied with alternating current, a train carried device having a magnetizable core provided with a winding controlled by current received from the rails of said section and in turn acting to vary the permeability of at least a portion of said core, train carried governing mechanism, and a circuit including a source of alternating current and having its impedance varied in response to variations of the permeability of said core for controlling said mechanism in accordance with the impedance of the circuit.

30. In combination, a section of railway track, means for supplying current to the rails of said section, a device comprising a magnetizable core provided with two windings, means for supplying one winding of said device with current in accordance with the current in said track rails for governing the impedance of the other winding of said device, a third winding, a circuit including a source of alternating current, said other winding of said device, and said third winding; and a signal controlled by current in said third winding and responsive to changes in such current due to change in the impedance of said other winding of the device.

FREDERICK W. LEE.